US011704624B2

(12) United States Patent
McFarland

(10) Patent No.: US 11,704,624 B2
(45) Date of Patent: Jul. 18, 2023

(54) ITERATIVE AND INTERACTIVE PROJECT MANAGEMENT PROCESS

(71) Applicant: William R. McFarland, Dallas, TX (US)

(72) Inventor: William R. McFarland, Dallas, TX (US)

(*) Notice: Subject to any disclaimer, the term of this patent is extended or adjusted under 35 U.S.C. 154(b) by 742 days.

(21) Appl. No.: 16/552,350

(22) Filed: Aug. 27, 2019

(65) Prior Publication Data

US 2020/0074405 A1 Mar. 5, 2020

Related U.S. Application Data

(60) Provisional application No. 62/725,761, filed on Aug. 31, 2018.

(51) Int. Cl.
  *G06Q 10/10* (2023.01)
  *G06Q 10/06* (2023.01)
  (Continued)

(52) U.S. Cl.
  CPC ........... *G06Q 10/103* (2013.01); *G06F 40/18* (2020.01); *G06Q 10/063114* (2013.01)

(58) Field of Classification Search
  CPC .................. G06Q 10/103; G06Q 40/18; G06Q 10/063114
  See application file for complete search history.

(56) References Cited

U.S. PATENT DOCUMENTS

| 5,890,131 | A | * | 3/1999 | Ebert | ................. | G06Q 10/1095 705/7.17 |
| 6,581,039 | B2 | * | 6/2003 | Marpe | ..................... | G06Q 10/10 709/200 |

(Continued)

FOREIGN PATENT DOCUMENTS

| CN | 103177328 A | * | 6/2013 | ............. G06Q 10/06 |
| CN | 106462555 A | * | 2/2017 | ........... G06F 16/958 |

(Continued)

OTHER PUBLICATIONS

Daniel W. Barowy, "CheckCell: Data Debugging for Spreadsheets", 2014, OOPSLA, Oct. 19-21, 2014, pp. 507-523. (Year: 2014).*
G. Shankaranarayanan, "Managing Accuracy of Project Data in A Distributed Project Setting", 2010, ICIQ, pp. 1-15. (Year: 2010).*
E. Mnkandla, "A Survey of Agile Methodologies", 2004, The Transactions of the SA Institute of Electrical Engineers, pp. 236-247. (Year: 2004).*
Alexandra Mihalache, "Project Management Tools for Agile Teams", 2017, Informatica Economica, vol. 21, No. 4, 2017, pp. 85-93. (Year: 2017).*

*Primary Examiner* — Tan D Nguyen
(74) *Attorney, Agent, or Firm* — James H. Ortega; Carstens, Allen & Gourley, LLP

(57) ABSTRACT

The disclosed principles provide for a unique and inventive iterative and interactive project management process implemented for organizations, typically large ones, to manage an overall project being originally implemented or newly created by the organization. Processes in accordance with the disclosed principles are interactive in that they employ the end-user employees of the organization by having those employees both input and update, on periodic cycles, information or data of the same type their positions in the organization allow them to be familiar with, and furthermore employ team-management level review and processing of such information/data, along with one or more supervisors of the overall project, which is/are not required to be part of the organization, to implement and supervise the disclosed process. The disclosed principles are also unique in that they provide for a process that employs the functional and advantageous features of both project management software and spreadsheet software products.

20 Claims, 15 Drawing Sheets

(51) Int. Cl.
    *G06F 40/18*     (2020.01)
    *G06Q 10/0631*   (2023.01)

(56) References Cited

U.S. PATENT DOCUMENTS

| | | | |
|---|---|---|---|
| 2008/0182232 A1* | 7/2008 | Bannwolf | H04L 69/28 434/350 |
| 2011/0302175 A1* | 12/2011 | Staaf | G06Q 10/06 707/E17.084 |
| 2014/0278819 A1* | 9/2014 | Ramsey | G06Q 10/06375 705/7.37 |

FOREIGN PATENT DOCUMENTS

| | | | | |
|---|---|---|---|---|
| CN | 107491373 A | * | 12/2017 | G06F 11/3037 |
| WO | WO-2012006453 A1 | * | 1/2012 | G06Q 10/06 |
| WO | WO-2016113602 A1 | * | 7/2016 | G06Q 10/02 |

* cited by examiner

WHY BOTH PROJECT MANAGEMENT AND SPREADSHEET SOFTWARE SHOULD BE EMPLOYED

| MS PROJECT | EXCEL | DISCUSSION |
|---|---|---|
| 1. Few non-technical financial institution employees are familiar with or use MS Project | 1. Most employees are familiar with Excel | |
| 2. MS Project does not allow for extensive editing of input fields, making it unsuitable for use as an entry mechanism for "ordinary" users (e.g. most team leaders cannot update their own project plans without significant training time/expense) | 2. Excel provides extensive options for editing/validating user input | |
| 3. MS Project does not provide any mechanism for tracking/auditing changes to critical fields (start dates, finish dates, % complete) | 3. Excel provides enough flexibility to allow this to be added | |
| 4. MS Project allows for summary task calculations many levels deep, such that when a sub-task is added all upstream dates and % Completes are dynamically recalculated automatically | 4. Excel has no way to re-calculate upward from added lower-level tasks without modifying formulae every time there is a change | |
| 5. MS Project provides an elegant mechanism for linking interdependent tasks | 5. Excel is inefficient at linking tasks in order to chain interdependent tasks | 5. A manual process which is inelegant but generally effective has been developed in Excel |

ISSUE

FROM FIG. 1A

6. MS Project can adjust (re-number) a Work Breakdown Structure (task list) automatically to reflect added or deleted tasks 6. Excel has no way to re-calculate a WBS when there is a change (added or deleted task)

7. MS Project's management reporting is unsophisticated and quite limited

7. Excel allows sophisticated and in-depth management reporting (charts, graphs, etc.) on individual and team progress, task slippage, etc.

7. Excel can perform Slipping Task calculations on every task within a project without cumbersome time-logging by staff members 8. MS Project cannot easily isolate tasks within a project plan that are due by a certain date (such as Go-Live date) and report on them separately 8. Excel can isolate tasks within a plan that are due by a certain date (such as Go-Live) and track them in addition to overall forward progress 9. MS Project cannot calculate where a task, summary task, etc. should be as of a given date 9. Excel can calculate where a task, summary task, etc. should be and calculate the variance 10. Filters in MS Project are very powerful and flexible 10. Filters in Excel are limited but serviceable and many users already know how to use them 11. MS Project produces very nice Gantt charts and allows for multiple baselines 11. Excel cannot produce Gantt charts or set a baseline efficiently 11. Baselines are largely irrelevant for conversion projects (conversions are unique one-time affairs)

12. MS Project is not supported with the same rigor as Excel (e.g. MS Project can be "buggy")

12. Excel is an extremely solid product

12. MS Project is also expensive, whether loaded to individual desktops or server-based (F) TRANSMITTING (PROCESSED UPDATES BACK TO THE CLIENT) - DETAILS AND EXAMPLES

| Name | Compres... | Size | Ratio | Date modified |
|---|---|---|---|---|
|  | 2,033 KB | 2,297 KB | 12% | 6/2/2018 6:54 PM |
| D8a) XYZ Progress 2018-05-30.pdf | 712 KB | 792 KB | 11% | 6/2/2018 7:12 PM |
| D8c) XYZ Slipping Tasks 2018-05-30.pdf | 86 KB | 90 KB | 5% | 6/2/2018 6:52 PM |
| D8d) XYZ Status Report Statistics 2018-05-30.pdf | 2,478 KB | 15,415 KB | 84% | 6/2/2018 9:44 PM |
| E9a) XYZ MSP 2018-06-02 ALL Teams.mpp | 2,555 KB | 16,178 KB | 85% | 6/2/2018 9:33 PM |
| E9b) XYZ MSP 2018-06-02 Team 08 Digital Delivery.mpp | 2,634 KB | 12,856 KB | 80% | 6/2/2018 9:14 PM |
| E9d) XYZ XL 2018-06-02 ALL Teams.xls | 93 KB | 548 KB | 84% | 6/2/2018 9:22 PM |
| E9e) XYZ XL 2018-06-02 Team 01 Compliance-Fraud Monitor'g.xls | 82 KB | 484 KB | 84% | 6/2/2018 9:22 PM |
| E9e) XYZ XL 2018-06-02 Team 02 Vertex Teller.xls | 130 KB | 782 KB | 84% | 6/2/2018 9:22 PM |
| E9e) XYZ XL 2018-06-02 Team 03 ArgoKeys Platform.xls | 152 KB | 914 KB | 84% | 6/2/2018 9:22 PM |
| E9e) XYZ XL 2018-06-02 Team 04 Synapsys CRM.xls | 119 KB | 698 KB | 83% | 6/2/2018 9:22 PM |
| E9e) XYZ XL 2018-06-02 Team 05 Call Center-iTalk-iVR.xls | 211 KB | 1,271 KB | 84% | 6/2/2018 9:22 PM |
| E9e) XYZ XL 2018-06-02 Team 06 Synergy.xls | 21 KB | 94 KB | 79% | 6/2/2018 9:22 PM |
| E9e) XYZ XL 2018-06-02 Team 07 Relationship Profitability.xls | 311 KB | 1,994 KB | 85% | 6/2/2018 9:22 PM |
| E9e) XYZ XL 2018-06-02 Team 08 Digital Delivery.xls | 234 KB | 1,420 KB | 84% | 6/2/2018 9:22 PM |
| E9e) XYZ XL 2018-06-02 Team 09 CIF-Tax Reportings.xls | 291 KB | 1,782 KB | 84% | 6/2/2018 9:22 PM |
| E9e) XYZ XL 2018-06-02 Team 10 ACH-Wires-Acct Analysis.xls | 449 KB | 2,780 KB | 84% | 6/2/2018 9:22 PM |
| E9e) XYZ XL 2018-06-02 Team 11 Deposit Accts-Safe Dep Box.xls | 189 KB | 1,143 KB | 84% | 6/2/2018 9:27 PM |
| E9e) XYZ XL 2018-06-02 Team 12 Loans-Collections.xls | 196 KB | 1,202 KB | 84% | 6/2/2018 9:27 PM |
| E9e) XYZ XL 2018-06-02 Team 13 Finance-Treasury.xls | 88 KB | 511 KB | 83% | 6/2/2018 9:27 PM |
| E9e) XYZ XL 2018-06-02 Team 14 Debit Cards-POS-ATMs.xls | 83 KB | 487 KB | 84% | 6/2/2018 9:27 PM |
| E9e) XYZ XL 2018-06-02 Team 15 Items Proc-Imaging Stmts.xls | 119 KB | 717 KB | 84% | 6/2/2018 9:27 PM |
| E9e) XYZ XL 2018-06-02 Team 16 Xperience-jExchange.xls | 66 KB | 387 KB | 83% | 6/2/2018 9:27 PM |
| E9e) XYZ XL 2018-06-02 Team 17 iSeries.xls | 340 KB | 2,153 KB | 85% | 6/2/2018 9:27 PM |
| E9e) XYZ XL 2018-06-02 Team 18 Cognos-jhaKnow.xls |  |  |  |  |

- XYZ Task List Folders 2018-05-30
  - (A) XYZ Input 05-30
  - (B) XYZ Scrubbing 05-30
  - (C) XYZ Updating 05-30
  - (D) XYZ Reporting 05-30
  - (E) XYZ Outputting 05-30
  - (F) XYZ Transmitting 05-30
    - F10) XYZ Task List RESULT

TRANSMITTING

FROM FIG. 10A

| Key Vendor Status | Status This Report | Status Last Report | Trends |
|---|---|---|---|
| IBS (Integrated Banking System) | | | |
| Deposits | ● | ▽ | ↗ |
| CeB (Consumer Online Banking) | ● | ● | → |
| BeB (Business Online Banking) and Treasury Mgt | ● | ● | → |
| Item Processing, Output, Imaging | ● | ▽ | ↗ |
| Interfaces | ▽ | ▽ | ↗ |
| Loans | ● | ● | → |
| Retail | ● | ● | → |
| Overflow Call Center | ● | ● | → |
| FIS Development | ● | ● | → |
| Quality Management | ● | ● | → |
| Third Parties | | | |
| Bankway (De-conversion of core, images, etc.) | ● | ● | → |
| Banker's Toolbox BAM+ | ▽ | ▽ | ↗ |
| Telecom | | | |
| Infrastructure (Networking, etc.) | ● | ● | → |

| Performance and Risk Indicators | Status This Report | Status Last Report | Trends |
|---|---|---|---|
| Qualitative Project Indicators: | | | |
| 1. Percent of key end users trained | ● | ● | → |
| 2. Key employee attrition | ● | ● | → |
| 3. Key employee overload | ▽ | ▽ | → |
| 4. Effectiveness of internal and external communications | ● | ● | → |
| Risk Impact Categories | | | |
| 5. Customer Experience | ● | ● | → |
| 6. Team Communications | ● | ● | → |
| 7. Staffing | ● | ● | → |
| 8. Vendor Performance | ● | ● | → |

| Status Indicators | | Trends | |
|---|---|---|---|
| ● | Satisfactory | ↗ | Improving |
| ▽ | Some Issues | Blank or → | Stable |
| ○ | Problems | ↘ | Declining |

An assessment of each team's Actual % Complete vs. Planned % Complete (calculated individually by team) and Slipping Task performance (number slipping and number slipping as a % of remaining tasks) measured against the % of Total Project Time Elapsed drives the Status indicator assessment (Red, Yellow, or Green) for each team and for project OVERALL status

ITERATIVE AND INTERACTIVE PROJECT MANAGEMENT PROCESS

RELATED APPLICATION

The present disclosure is a non-provisional conversion of, and claims priority to, U.S. Provisional Patent Application Ser. No. 62/725,761, filed Aug. 31, 2018, which is incorporated herein by reference in its entirety for all purposes.

TECHNICAL FIELD

The present disclosure relates generally to project management procedures, and more particularly relates to a unique iterative and interactive project management process.

BACKGROUND

Project management software products are designed to assist a project manager in developing a plan for projects, assigning resources to tasks within such projects, tracking progress of individual tasks and projects, managing related budgets, and analyzing workloads among resource (personnel, equipment and financials). Project management software has the capacity to help plan, organize, and manage resource tools and develop resource estimates for all projects and tasks within the projects. Depending on the sophistication of the software, it can manage estimation and planning, scheduling, cost control, as well as provide budget(s) management, resource allocation, collaboration software, communication, decision-making, quality management and work with documentation or administration systems. An example software product is Microsoft Project® developed and sold by Microsoft Corporation of Redmond, Wash. In the detailed discussion herein, exemplary processes in accordance with the disclosed principle refer to Project when discussing those portions of the disclosed process(es) that involve project management software. It should therefore be understood that such references are merely exemplary in nature, and any other project management software products may also be employed with those portions of the disclosed principles.

Those skilled in the art understand that such project management software products, while quite useful in their targeted areas, suffer from a number of shortcomings that they were simply not intended to provide when the "time" element is not flexible and only "scope" and "resources" can be varied. For example, products like MS Project cannot track/audit changes made to certain critical fields after the project(s) are started, such as start dates, finished dates, percentage complete, and the like. Also, such project management software cannot easily isolate individual tasks, without excess effort, within an overall project plan and report on those individual tasks or groups of tasks separately. Similarly, such software products cannot calculate where the projected status/progress of a task or groups of tasks should be at a given date, or a summary of what parts of a task should be done by such projected date(s). Moreover, management reporting, such as the creation of various illustrative graphs and tables is quite limited. For example, MS Project is typically limited to only certain types of graphs, such as Gantt charts, and thus cannot provide the full spectrum of visual reporting capabilities as a spreadsheet typically can. This is understandable due to the primary focus of such project management software products, which is more focused on project organization rather than information calculation and reporting. Accordingly, other software products with these missing capabilities must be employed in addition to the project management software if such capabilities are to be had.

One such software product that can provide such missing capabilities is a spreadsheet program that features calculation of data, as well as presentation tools such as graphing tools, pivot tables, and the like. A "spreadsheet" is an interactive computer application for organization, analysis and storage of data in tabular form. Spreadsheets are developed as computerized simulations of paper accounting worksheets, which are typically provided as a columnar pad. An example software product is Microsoft Excel®, which is also developed and sold by Microsoft Corporation. In the detailed discussion herein, exemplary processes in accordance with the disclosed principles refer to Excel when discussing those portions of the disclosed process(es) that involve such spreadsheet software. It should therefore be understood that such references are merely exemplary in nature, and any other spreadsheet software products may also be employed with those portions of the disclosed principles.

However, those skilled in the art also understand that such spreadsheet software products also have a number of shortcomings that they were not designed to provide. For example, MS Excel cannot recalculate "upwards" when additional lower-level tasks are added outside of the original range of the existing formula(e) without modifying such formulae every time there is a change outside of the original formula's range(s). Also, such spreadsheet software products are inefficient to link multiple, distinct tasks in order to chain interdependent tasks together. Furthermore, such software products cannot recalculate a Work Breakdown Structure (WBS) when there is a change made such as the adding or deleting of a task within the overall project. Moreover, MS Excel cannot produce Gantt charts (a very commonly used tracking/reporting tool used in project management reporting), set and manage a baseline efficiently, or identify the critical path—all commonly used when reporting on the progress and projections of tasks within an overall managed project.

FIGS. 1A and 1B provides a chart setting forth both capabilities and deficiencies of both MS Project and MS Excel, and thus why both types of software products are important and thus should be implemented together in order to perform a project management process in accordance with the disclosed principles. While skilled software developers might attempt to create a software product to interface such project management and spreadsheet software, such interface software would be not feasible without determining which aspects and feature of each software product to interface between, as well as when such interfacing should be done. Thus, creating a fully interfacing software product is not a viable option as the specific dynamic changes implemented by users of either (or both) of the combined software products cannot all be known ahead of time in order to properly create interfacing software. Accordingly, what is needed in the art is an interactive and iterative process to be implemented by users of these two types of software products that permits dynamic implementation and alteration/updating of the input and output data used with these software products. The disclosed principles provide such a process and other improvements.

SUMMARY

The disclosed principles provide for a unique and inventive iterative and interactive project management process implemented for organizations, typically large ones, to manage an overall project being originally implemented or newly created by the organization. Processes in accordance with the disclosed principles are interactive in that they employ the end-user employees of the organization by having those employees both input and update, on periodic cycles, information or data of the same type their positions in the organization allow them to be familiar with, and furthermore employ team-management level review and processing of such information/data, along with one or more supervisors of the overall project, which is/are not required to be part of the organization, to implement and supervise the disclosed process. The disclosed principles are also unique in that they provide for a process that employs the functional and advantageous features of both project management software and spreadsheet software products.

Exemplary projects for organizations in which a project management process in accordance with the disclosed principles is implemented are typically unique one-time efforts (i.e., not repetitive, where there is an existing pattern or "template" to follow). Such overall projects typically have never been done before within the organization and will not be done again, hence the lack of an internal process for the organization to follow. An example might be the entire migration within a financial institution from one specific financial system or platform to another. Moreover, such projects are typically very large (e.g., thousands of tasks or more), but are not the type of projects or procedures that are the actual expertise of the organization; thus, the need for an external process as disclosed herein being needed for implementation. However, these projects will require a high degree of user-provided (end-users within the organization) expertise which the disclosed process uses to "tease out" what the end-users know, for example, because the vendor of the new system, if the overall project is a system/platform migration, would not have that organization's specific information. Moreover, the disclosed process is typically implemented in a very "procedural" environment (as one would expect in a highly-regulated environment such as a bank or credit union), and they are complex (i.e., there are many sub-systems operating under a larger or over-arching or core system). Still further, these projects will almost always have a fixed deadline so that the deadline for completing them is not flexible.

BRIEF DESCRIPTION OF THE DRAWINGS

The novel features believed characteristic of the disclosure are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIGS. 1A and 1B illustrate a chart setting forth both capabilities and deficiencies of both MS Project and MS Excel to demonstrate why both types of software products are implemented together when performing a project management process in accordance with the disclosed principles;

FIG. 8 illustrates a folder tree setting forth an exemplary set of updated information/data;

FIGS. 10A and 10B illustrate an exemplary Status Report generated using the derived information from an iterative and interactive project management process according to the disclosed principles.

DETAILED DESCRIPTION

The various embodiments of the presently disclosed subject matter are described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies. The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Also, the use of terms herein such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

Figure 2:
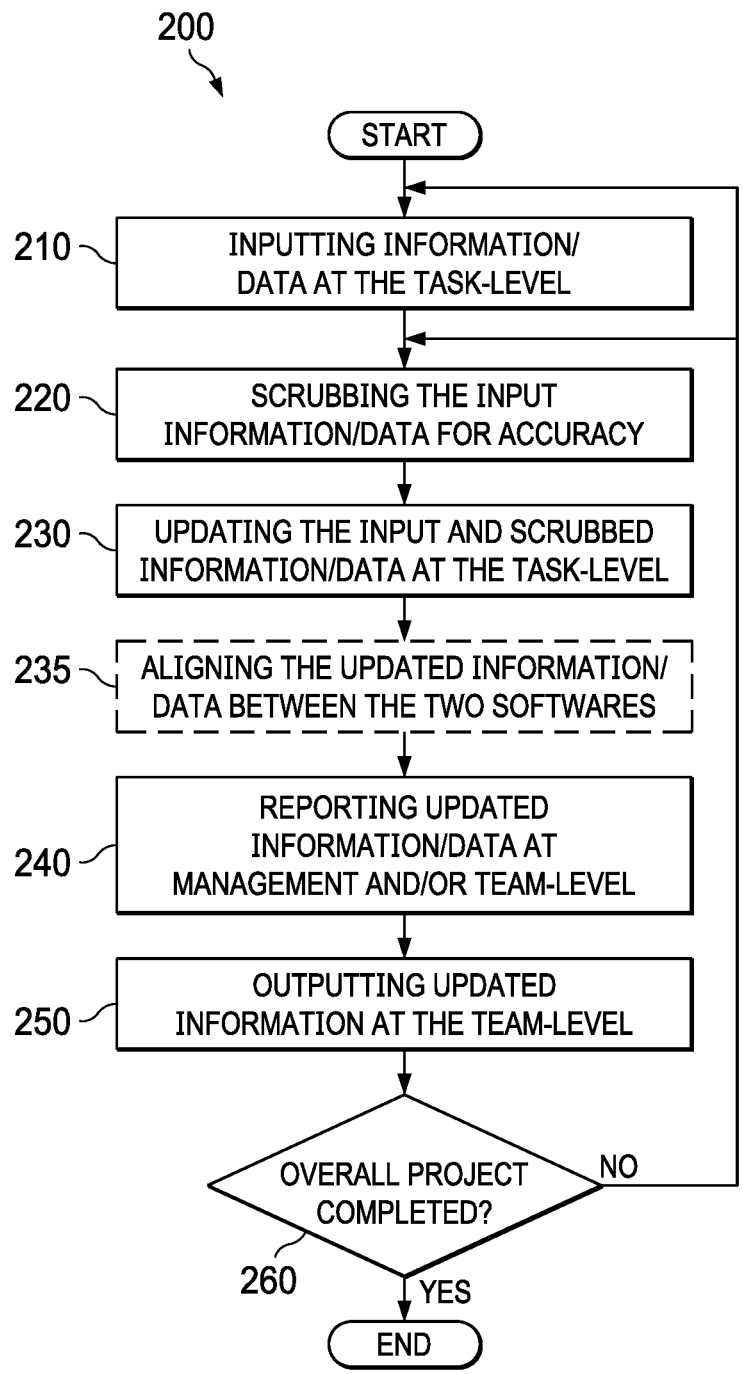
FIG. 2 illustrates a flow diagram setting forth an embodiment of the overall process flow for an iterative and interactive project management process conducted in accordance with the disclosed principles.

Turning to FIG. 2, illustrated is a flow diagram 200 setting forth an embodiment of the overall process flow for an iterative and interactive project management process conducted in accordance with the disclosed principles. The process steps set forth in flow diagram 200 of FIG. 2 are general in nature, and the details of each process and sub-process(es) within each general step are discussed in further detail below. In addition, it should be noted that the overall process flow in FIG. 2 may also include fewer or a greater number of steps, or certain illustrated steps may be broken in multiple steps, with such variations still falling within the broad scope of the disclosed principles.

After start of the exemplary overall process, information is input at a Step 210. The information to be input for use by the disclosed process includes, but are not limited to personnel and department identifiers, overall project start date, finish date and any critical dates or milestones, as well as information regarding all of the separate tasks to be completed in order to complete the overall project. Examples of personnel information include, but is not limited to, departments responsible for completing tasks, team identifiers for teams assigned to certain tasks, and the individual persons assigned to teams, departments, tasks, etc. In addition, multiple levels of such information may also be input. Examples of task information includes, but is not limited to, task names, task start dates, finish dates and any critical dates in between, teams assigned to each task, and task outline levels for multiple levels of task, such as where certain tasks are parts of a larger task within the project, or where certain tasks are required to be completed before other tasks may be started or completed. Also, dependency codes for some or all tasks may also be created and input, as well as any notes that should be considered when evaluating the planning, progress or completion of certain tasks.

Importantly, other task-based information that may be input is the percentage of completion for each task. Such percentage information would be input during the progression of the task(s), as well as the overall project. Thus, it must be understood that the input step 210 is not only an initial step in the disclosed process(es), but the disclosed principles provide the capability of inputting new information, or revising previously input information, while still attaining the benefits of both project management and spreadsheet software without having to reprogram or revise formulae or other items of each software product. Still further, other critical date or user-defined information may also be input ahead of or during the overall project, as needed.

The various information input during a process in accordance with the disclosed principles may be from a variety of sources with the organization whose project is being managed. Moreover, those sources may be automated or manually input. Individual teams and team members will typically provide the information appropriate for their assigned tasks within the project. Team structure, both within each team and how all teams are organized in relation to one another, is determined based on the organizational structure of the organization conducting the project. Specific team structure(s) are defined as needed to accomplish the tasks within the project, and the individuals that should participate in each team (and sub-teams and subs-sub-teams, etc. if applicable). Such team structures are custom-made to fit every organization's unique organizational structure, individualized talents and the abilities of its personnel. By creating and structuring such teams, all necessary business functions may be validated as being represented on appropriate teams. Moreover, as individuals are assigned to one or more teams, sufficiency of team membership and resources can be determined, cross-functional participants are assigned where needed, and potentially overcommitted individuals and/or resources can be identified and thus moved appropriately. In addition, team assignments are created to define the specific responsibilities and procedures assigned to each team, which is in turn tailored to the organization's unique mix of products and services. Doing so can clearly identify the business functions to be altered by the overall project, and the team responsible for those functions whether they be covered by a single or multiple tasks. Moreover, who will be responsible for each task, the start, finish and critical dates for each task, and other information regarding each task will also be identified.

In exemplary embodiments discussed herein, the organization implementing a process in accordance with the disclosed principles is a financial institution, such as a large bank. In a financial institution environment, team structure may comprise the structure set forth in Table 1. However, in other implementations of a process in accordance with the disclosed principles, the number, name and tasks for each team may differ.

TABLE 1

| Team Identifier | Team Description |
|---|---|
| 01 | Deposits |
| 02 | Internet Banking (Home Banking) |
| 03 | Check Processing, Check and Document Imaging, Output Reports |
| 04 | Data Quality Management (Data Integrity) |
| 05 | Information Technology and Networking |
| 06 | Interfaces to Other Supporting Systems |
| 07 | Reporting, Business Intelligence and Data Warehouse |
| 08 | Conversion Support |
| 09 | Loans |
| 10 | Accounting and Finance |
| 11 | Retail Banking (Tellers, New Accounts, Call Center, Customer Service) |
| 12 | Fraud, Bank Secrecy Act, Anti-Money Laundering, Suspicious Activity |
| 13 | Communications, Internal and External |
| 14 | Training |
| 15 | Sarbanes-Oxley and Regulatory Compliance |

Figure 3A:
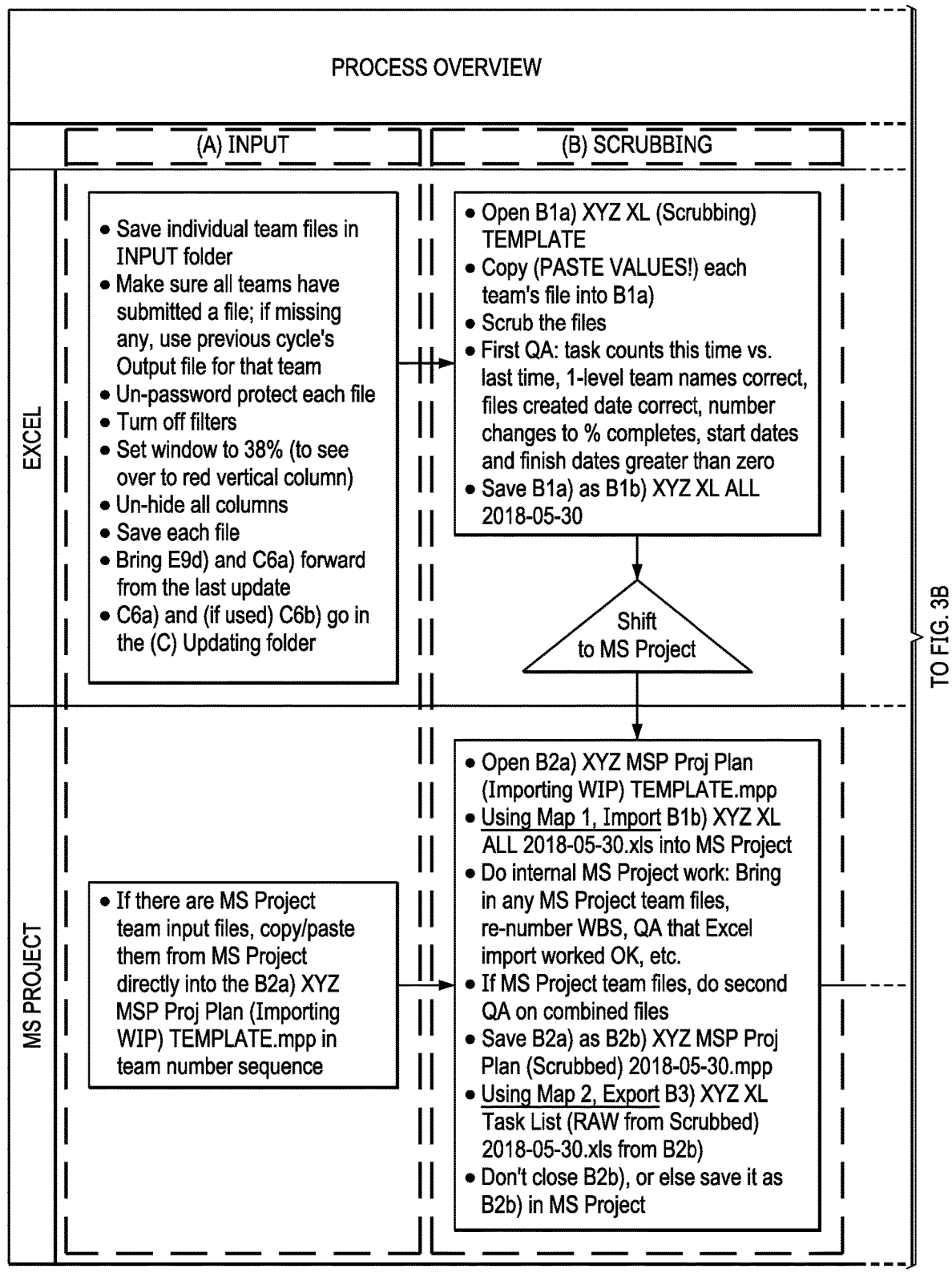
FIGS. 3A, 3B and 3C illustrate a process overview of an exemplary project management process as disclosed herein, as may be followed by specific consultants or trained users within the organization conducting the overall project.
Figure 3B:
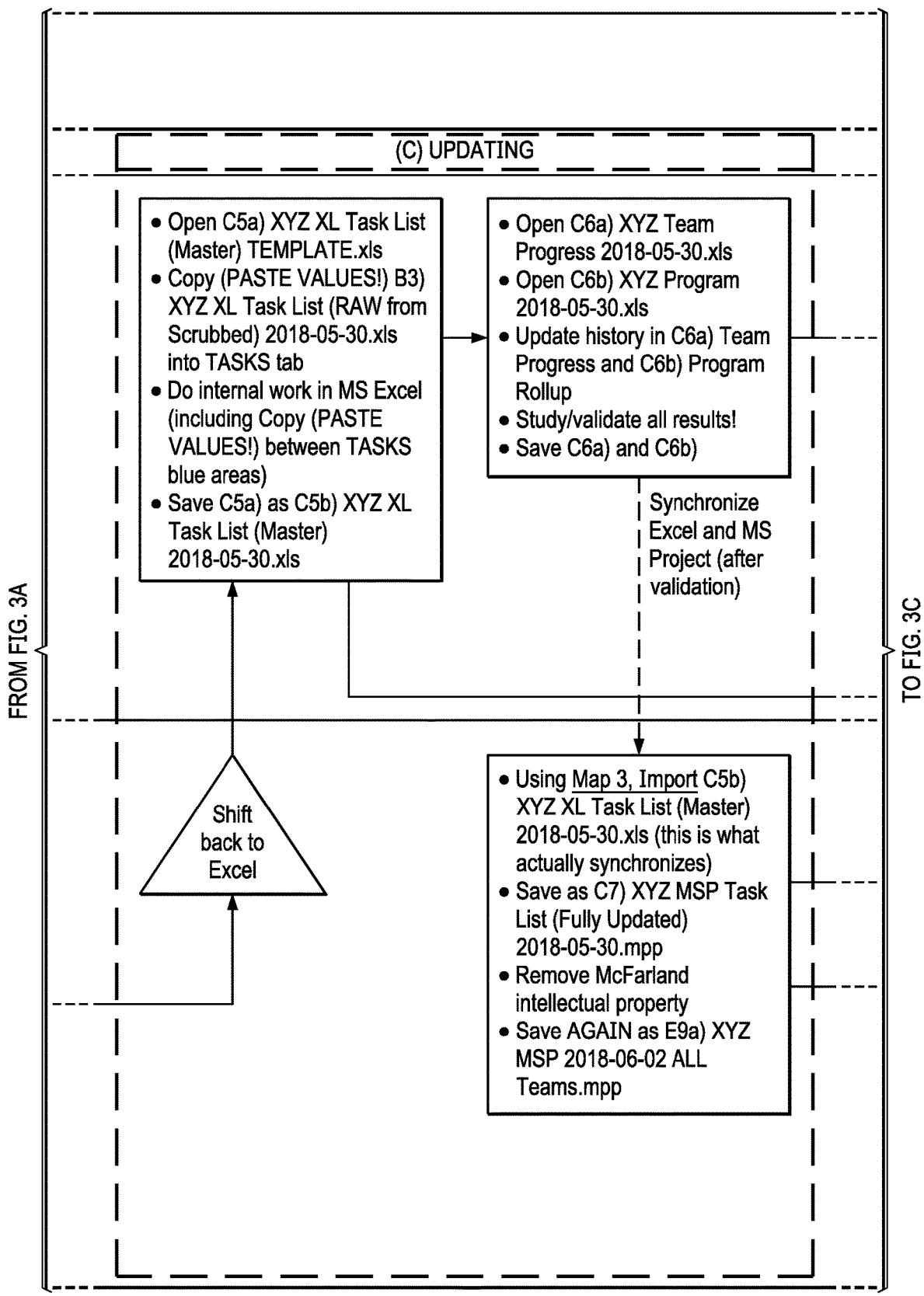
Figure 3C:
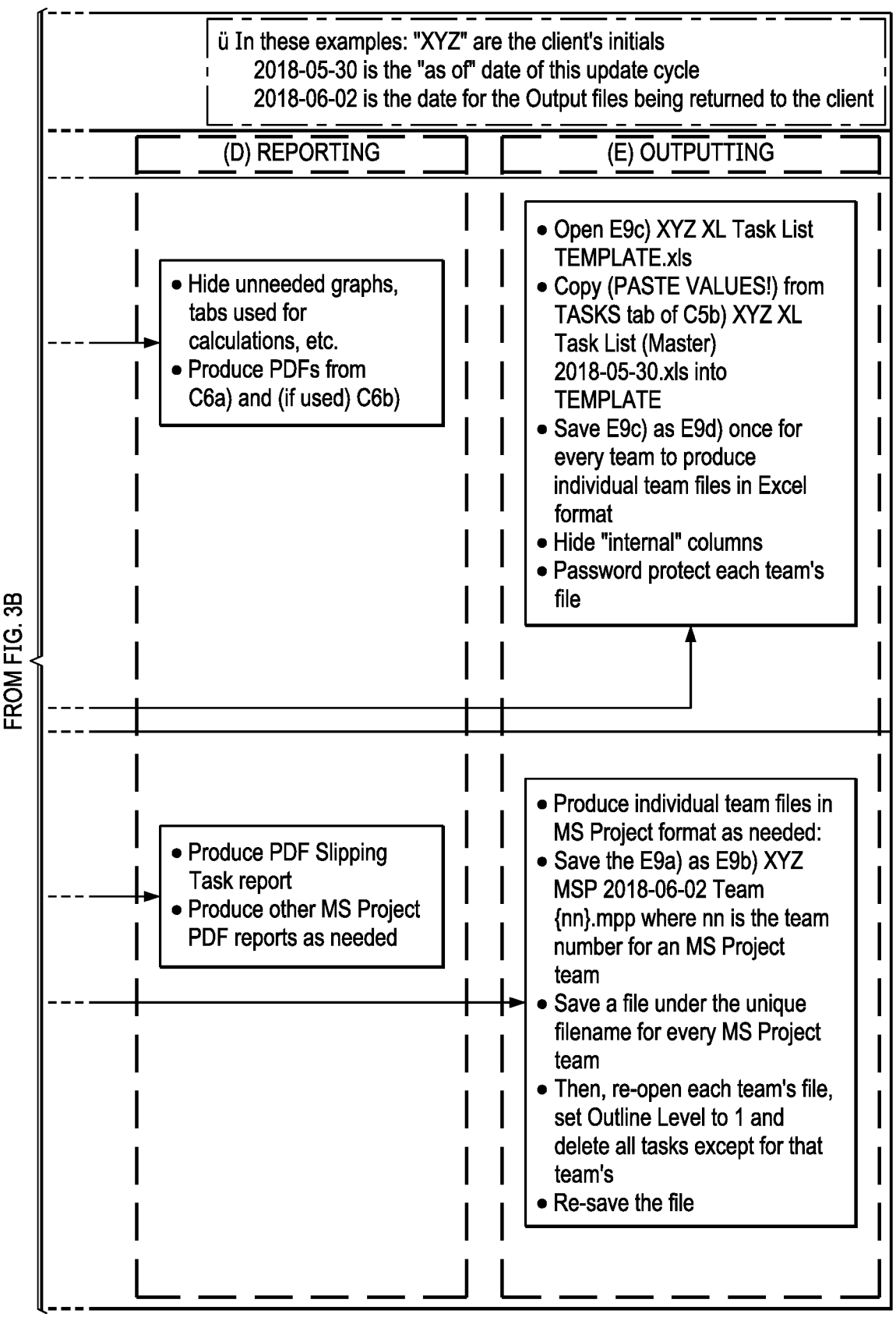

In accordance with the disclosed principles, the information is input by each team, or individuals within each team. In exemplary embodiments, the information is collected by some teams through entry into a spreadsheet software product, such as MS Excel, while information collected by other teams, or alternative types of information by the same team(s), is provided or collected through a project management software product, such as MS Project. Such initial step is usually done in Excel because it is easier/faster than doing it in MS Project primarily due to the overall prevalence of end-user business knowledge of Excel over Project. Thus, the disclosed process may be implemented without requiring end-users in an organization who will be initially inputting information/data to learn a specialized software tool, such as MS Project or other project management software product, which many end-user business people do not use frequently if at all. However, such initial inputting can be done in either type of software because a project management process according to the disclosed principles is "bilingual" in that it can use either one. As used herein, providing or collecting such input information may comprise physically keying in data by a person or persons manually, or it may comprise persons causing such data to be imported into the software product via a computer-based process, or data may be automatically input as an automated response to another process step(s). Moreover, collected information may be provided as output from a previous update cycle from one or more teams on a regular (usually weekly or bi-weekly) basis. Turning briefly to FIGS. 3A, 3B and 3C, collectively illustrated is a process overview of an exemplary project management process as disclosed herein, as may be followed by specific users within the organization conducting the overall project. The illustrated process overview is separated based on the steps set forth in the process flow of FIG. 2. The initial step of the disclosed project management process is the Input step and includes input both through MS Excel and MS Project, as discussed above.

Any number of purposes or goals are attained by the inputting of new or revised information. Included among these are to: initially provide the information needed to assess each task and sub-task for the overall project; correct or update the description/requirements of any task; adjust the outline level of a task to raise a task to a "summary" level or to make it a sub-task underneath an existing task; change the resource name of a task to make another person or team accountable for that task; update the percentage completed of any task; modify the start, finish and/or critical dates of any task; add additional user-defined information about a task or group of tasks; add new sections (e.g. a new group of tasks or sub-tasks) within the project or a task; add new tasks or sub-tasks within existing sections; indicate when a task is dependent on another team, another individual or an external vendor; delete tasks which are no longer needed for any reason (erroneous entries, tasks determined to be unnecessary, tasks incorporated into other tasks, etc.); and add notes (e.g. comments) regarding any task or its status. Of course, other purposes and goals may also be met by the inputting of information in accordance with the disclosed principles.

It should be noted that there is no other manner in which to input all necessary information as efficiently as requiring information from each team and regarding all tasks. As such, there is no fully automating or computer-based means of inputting all needed information, as the type and details of information regarding each team, team member, and tasks and sub-tasks is truly customized as any of these parameters change within each project and within each organization. Thus, although the inputting of information in accordance with a process of the disclosed principles may seem inefficient as compared to a fully automated procedure, the lack of any such automated product or tool that is guaranteed to provide each and every piece of information required by the disclosed process results in the disclosed inputting process as truly the most efficient manner of information input.

Figure 4A:
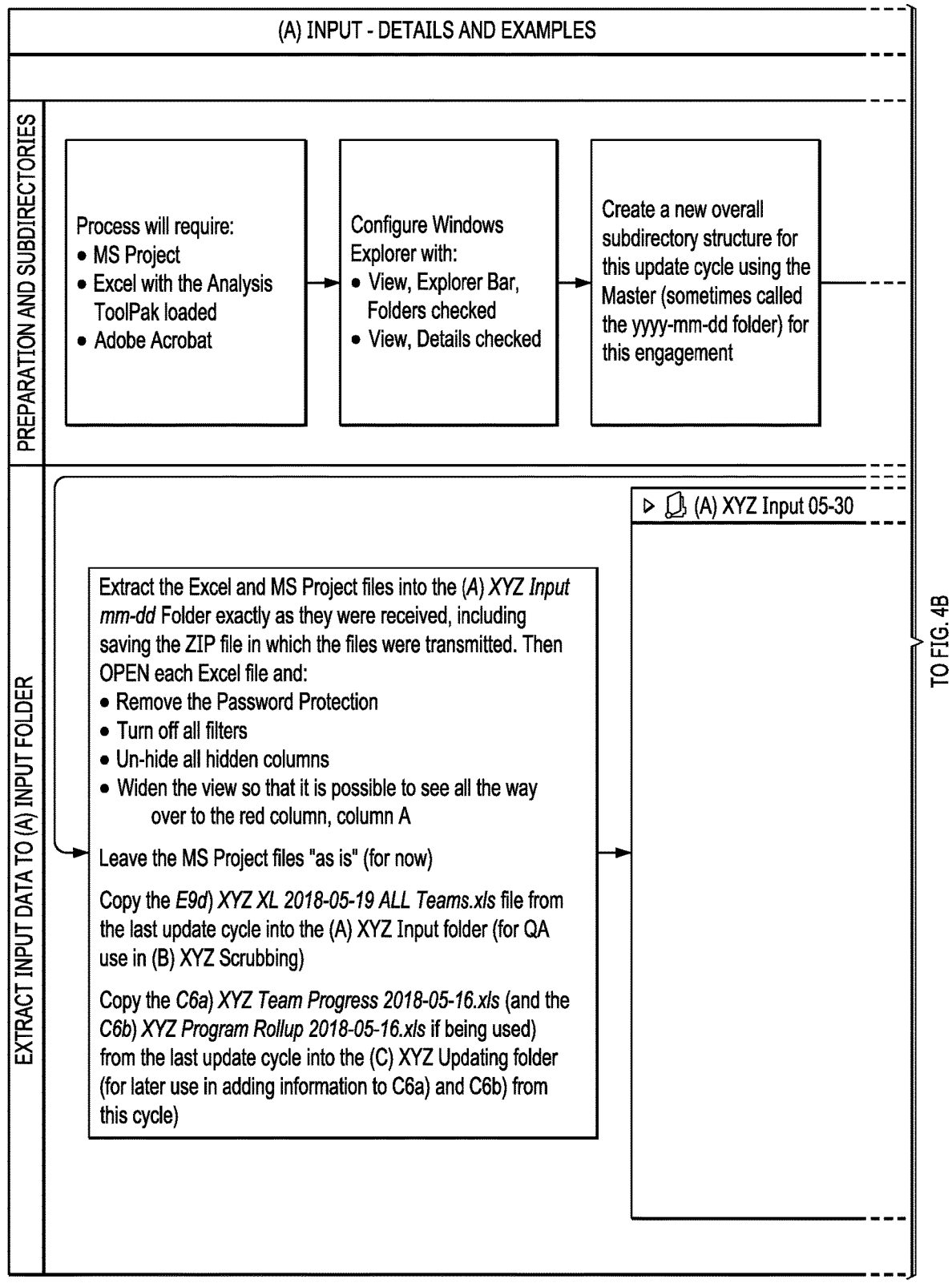
FIGS. 4A and 4B illustrate a more detailed exemplary sub-process flow for the input step introduced in the process of FIG. 2 and set forth in further detail in FIGS. 3A-3C.
Figure 4B:
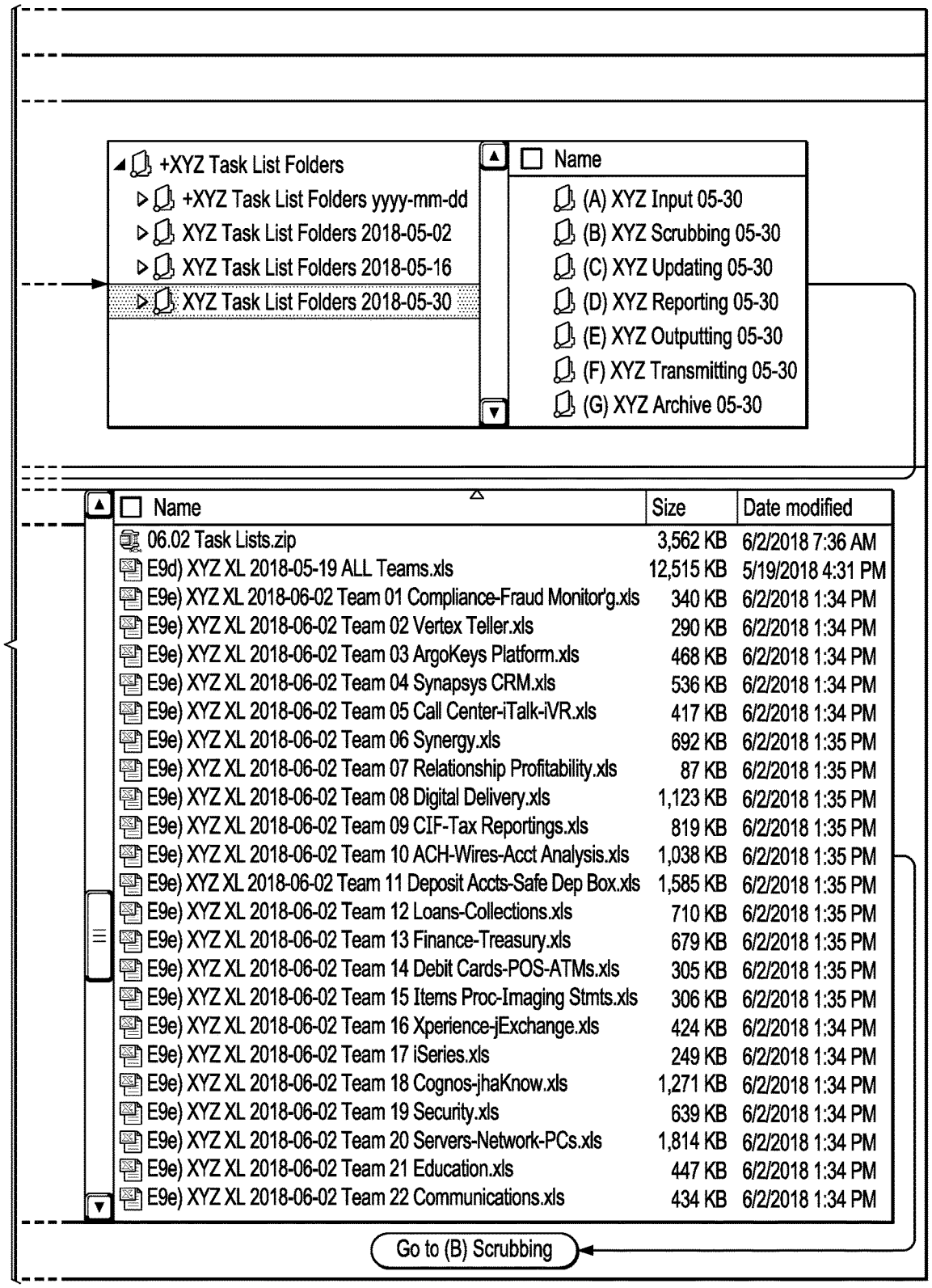

Within a project management process in accordance with the disclosed principle, every task is "rolled up" into the reporting structure, providing a comprehensive top-to-bottom set of reports which incorporates every task which must be performed by every team, and which can be generated and presented or updated at any time during the project. An equivalent comprehensive top-to-bottom analysis is not achievable with either existing project management or spreadsheet software products alone, especially for projects having thousands of individual tasks like the projects the disclosed process is capable of managing. Those skilled in the art and familiar with the capabilities of both project management and spreadsheet software products will understand that with projects of the size and complexity that the disclosed process is capable of managing, any one task can potentially derail the entire overall project from being completed by the target date. Even one or two critical tasks buried in a maze of thousands of mundane tasks are potentially disastrous, so project management must constantly flex between managing and reporting on the overarching status of the project, along with managing/correcting every single task which is not on schedule. Looking at FIGS. 4A and 4B, collectively illustrated is a more detailed exemplary sub-process flow for the input step 210 introduced in FIG. 2 and set forth in further detail in FIGS. 3A-3C. Such a sub-process may first include accessing each of the software products used to create the input data. In addition, as illustrated, a file folder program, such as Windows® Explorer, may be used to create a subdirectory structure, which may include creating folders, and related subfolders, for storing and organizing the files comprising the input data provided by each of the teams involved in the overall project. Such a computer-based file folder program permits the ability to store, organize and view such files regardless of the software product used to create the input data files. Once a directory and subdirectory structure is created, the input data can then be extracted into the appropriate file folders or subfolders. As with all figures herein, the specific files, folders, subfolders, and directory and subdirectory structures illustrated in FIGS. 4A and 4B are merely exemplary, and therefore no limitation to the specific illustrated embodiments is intended or should be implied.

Turning back to FIG. 2, the next step in a project management process in accordance with the disclosed principles is the manual and automated scrubbing of input information at Step 220. Specifically, the information input by the teams at Step 210 is scrubbed to ensure that every task has a start and finish date, that the percent complete information provided during a particular task is a valid value, and other critical parameters are valid. The purpose/goal of the scrubbing step is to ensure that the necessary calculations in either the spreadsheet or project management software can be performed accurately, as well as to ensure that all information reported out to the organization is likewise accurate. Importantly, the scrubbing step is typically performed by a centralized user or users that is/are independent of the team members, and in particular the team member(s) that entered the information originally. For example, the disclosed process requires that all percentage complete entries must be input as an actual percentage. As such, textual data such as "TBD" or "To Be Determined" is not allowed for the disclosed process. During the scrubbing step, if any invalid characters are contained in the input data, they will be scrubbed such that they are replaced with valid characters. Additionally, during the scrubbing process, the software product used for inputting information identifies other invalid data entries, such invalid or missing date entries, and flags them for manual correction. Still further, some scrubbing may be accomplished by a software application configured to find such errors, and in some cases the software may even correct errors.

An exemplary process for scrubbing the input information may include, as mentioned above, the software product used to enter the data in the first place automatically detecting invalid characters. Moreover, the implementer of a process as disclosed herein may alter or create one or more programs within the data entry software product to detect specific invalid entries that may not be automatically detectable by the software in its original form. Thus, the software code identifies missing or invalid dates, invalid percentage completion characters, task outline levels, and other errors regarding information/data input for the disclosed project management process so that they can be manually corrected. In an exemplary embodiment, such correction may be a two-step process. First, detected invalid characters are corrected automatically by the data entry software product. Then, any other errors which have been identified by the software but not capable of automatic correction (i.e., something the user would know but the software would not) are identified for correction manually in a second step. Once corrected, errors are not repeated because the corrected files are sent back to the teams that originally entered the data (i.e., for updating during the ongoing overall process), and those errors do not have to be re-corrected. As a result, the scrubbing step, which is repeated at predetermined periods (e.g., weekly) or milestones (e.g., at certain critical or completion dates), is an iterative process with the overall quality of all information/data associated with the overall project being managed improving with every scrubbing/update cycle. In an advantageous embodiment, the software product used for error detection and correction is the spreadsheet software, such as Excel, as such software is typically written with data entry error detection capabilities, due to the spreadsheet software's calculation and sorting capabilities. In contrast, typical project management software products are not especially good at detecting and catching information errors as such software is typically designed primarily to organize whatever information it is provided with and calculate projected finish dates. Turning back briefly to FIGS. 3A-3C, the second step in the illustrated process overview of an exemplary project management process as disclosed herein is the Scrubbing step and includes using both MS Excel and MS Project, as discussed above.

Figure 5:
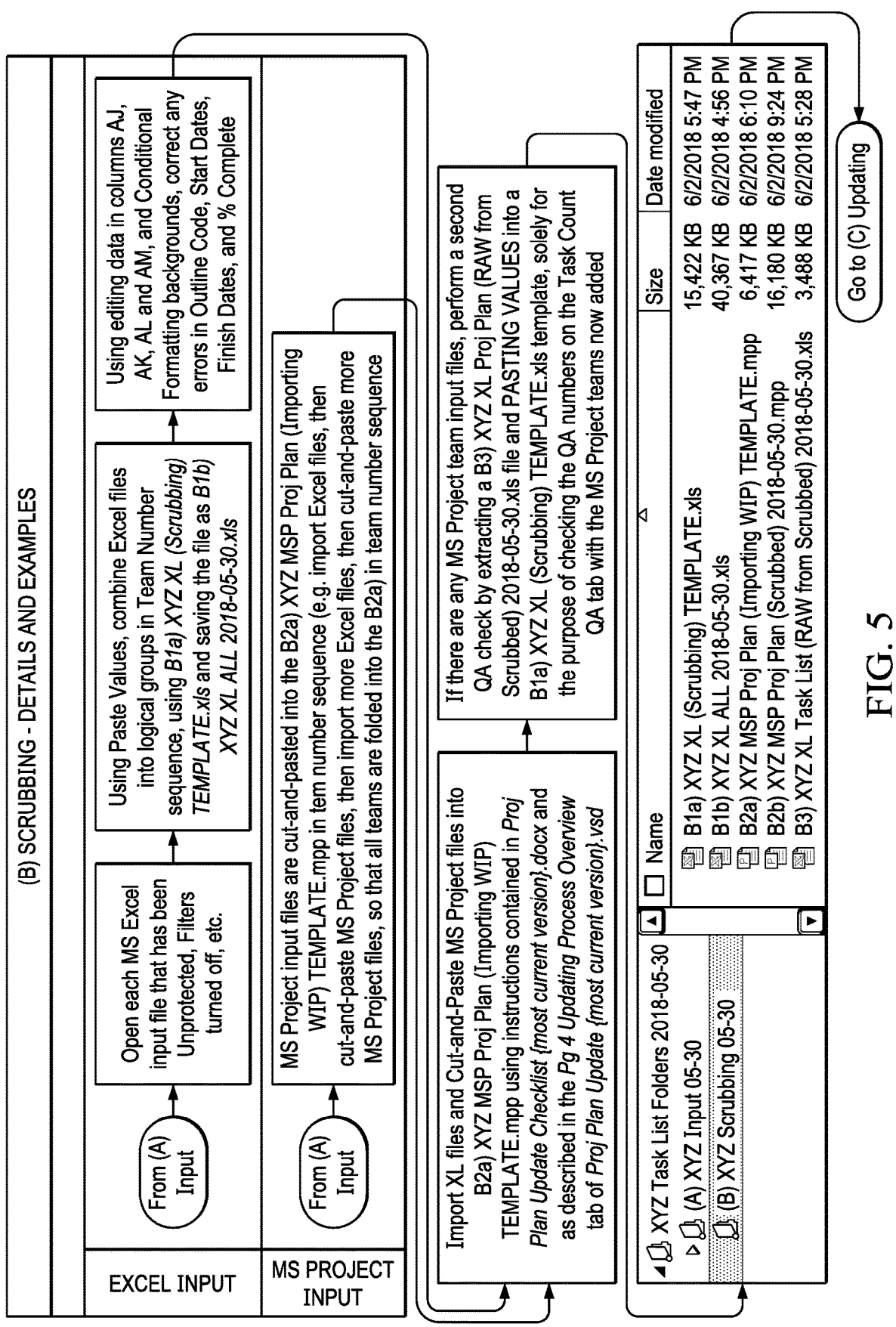
FIG. 5 illustrates a more detailed exemplary sub-process flow for the scrubbing step introduced in the process of FIG. 2 and set forth in further detail in FIGS. 3A-3C.

Other information is created automatically for each task by the software and is then used for tracking and reporting task status going forward (e.g. the last cycle's output is used as input for the next cycle in an iterative process). Exemplary information that may be created and/or used in this manner may include, but is not limited to baseline Start Date and baseline Finish Date for the overall project and for each task (or sub-task, etc.) within the overall project, tracking Percent Complete of any task, reference Start Date and reference Finish Date, and information regarding what Percent Complete has been changed from with respect to a prior cycle. Other information can include the number of Start Date changes, what the Start Date(s) have been changed from, the number of Finish Date changes, and what the Finish Date(s) changed from. Also, the File Dates (e.g., when was this file created?), if something is a Summary task, the MS Project Unique ID of a task, the Unique Sequence Number for such task(s), and the Team Number for each task. Progress information may also include if a certain task is Slipping (e.g., is it behind schedule?), what is the Percent Due as of the current Status Date (e.g., update cycle date), what is the Percent Variance from the prior schedule, information on whether the particular task will be behind schedule at the next cycle (e.g., is it coming due?), and what percent of this particular task is due by the project's implementation (e.g., completion) date. Of course, other information may also be included. Looking at FIG. 5, illustrated is a more detailed exemplary sub-process flow for the scrubbing step 220 introduced in FIG. 2 and set forth in further detail in FIGS. 3A-3C. Such a sub-process may first include opening each input data file using the corresponding software product used to create the input data. The illustrated sub-processes for the two exemplary software products may then include the cutting/copying and pasting of data entries in the manner illustrated; however, it should be noted the specifically illustrated steps in doing so are merely exemplary. Therefore, no limitation to the specific illustrated embodiments is intended or should be implied. Advantageously, in addition to finding and correcting errors, the scrubbing step provides the opportunity to combine input data into a lesser number of corresponding software product files, thereby reducing the overall number of data files. Such reduction also assists in the compiling and reporting of overall data, as needed.

Returning to FIG. 2, at a step 230 in a project management process in accordance with the disclosed principles, the input and scrubbed information is updated. During the updating step, any of a number of pieces of information is updated, and the updating is based on new information input during the overall process. As with the initial inputting of information, users within the organization are tasked with providing updated or new information, as needed, at a predetermined interval. For example, updating may be scheduled to be done on a weekly basis, or any other advantageous time period. Depending on how tightly managed the overall project, or just certain portions of the overall project, will be, the updating cycle may even be as often as daily or any other desired interval in order to closely track progress on some or all task of the project. Also, such updating may be different for the various teams across the project, as more frequent updating may be needed for some teams/departments in the organization, while not so much for other teams. Additionally, as the initial inputting of information/data may be via either the project management software or the spreadsheet software, the updating of information/data may also be through either software product.

For example, information that may be updated with the project management software could include the baseline start date and/or baseline finish date for the overall project being managed by the process of the disclosed principles. Yet other information/data to be updated via the project management software product typically will include, but is not limited to, Work Breakdown Structure (i.e., a deliverable-oriented and hierarchical breakdown of a project into smaller components which organizes teams' work into manageable sections for a subdivision of effort required to achieve an objective) coding. Percent Complete for any/all task(s), calculated from the bottom up, is also a critical calculation provided. As discussed above, spreadsheet software, such as Excel cannot handle such updating efficiently when tasks or percentage updates are added lower down in the outline hierarchy, due to formulae being written for calculating an initial set of spreadsheet lines. With the ability to manage many thousands of tasks in a project management process in accordance with the disclosed principles, many thousands of formulae would have to be revised every update cycle/period (e.g., daily, weekly or bi-weekly) if only a spreadsheet software product is used in an effort to duplicate a project management process as disclosed herein.

Also during the updating step 230, information is updated at the predetermined period (which may or may not differ than the update cycle for the project management software input information) with the spreadsheet software product. Examples of such information/data that is updated via the spreadsheet software product includes, but is not limited to, tracking percent complete (i.e., what was the task's percentage complete as of the previous update cycle?), reference Start Date (i.e., what was the task's Start Date as of the previous update cycle?), reference Finish Date (i.e., what was the task's Finish Date as of the previous update cycle?), and if the percent complete (for a given task) has been changed from the previous update cycle. Still other updated information may include Start Date number of changes, what the Start Date has been changed from, Finish Date number of changes, what the Finish Date has been changed from, the File Date (e.g., when was this file created?), entry of a Unique Sequence Number for a given task, and the Team Number of a given task. Other important update information may also include data regarding if a given task is Slipping (e.g., is it behind schedule?), what is the Percent Due as of the current update cycle date, what is the Percent Variance from the schedule, will this task be behind schedule on the next update cycle (e.g., is it "coming due"?), what percent of this task is due by the project's implementation date, remaining Duration Days if this is an Incomplete Task, what is the variance in days allowed before this task is reported as Slipping, what is the variance in Percentage Complete before this task is reported as Slipping, what is the variance in days before this task is reported as potentially slipping (e.g. is it coming due soon?), what is the variance in percentage complete before this task is reported as potentially slipping (e.g. is it coming due soon?), how many teams are there supposed to be on this project, how many days are there before the Implementation Date, what percent of the total number of tasks have been completed, what percent of the grand total number of days (e.g., for all tasks and all teams) have been completed, and does a given team's tasks roll up to another level (e.g., in addition to the outline levels within each team's plan, entire sets of plans can be summarized at one or more different higher management reporting levels). Interdependencies between tasks, summary tasks and teams can be easily and efficiently tracked and reported on. For this latter information, if the project management task information is being rolled up to another level, all of the above information can be grouped and summarized uniquely at those levels.

Turning back briefly to FIG. 3B, the third step in the illustrated process overview of an exemplary project management process as disclosed herein is the Updating step and again includes using both MS Excel and MS Project, as discussed above. Any of such information/data may be updated in either the project management or spreadsheet software, once the initial scrubbing is completed, and may be accomplished, for example, by importing the scrubbed information into MS Project, which automatically recalculates the Work Breakdown Structure and Percent Complete for any and all tasks. This is typically calculated from the bottom up, which is extremely difficult if not impossible (and thus economically impractical) to do in spreadsheet software like MS Excel for at least the reasons discussed above. The information is then exported from MS Project back into Excel so that Excel can accomplish the computationally-heavy calculations using the updated information, which Project and other project management software products do not do at all or do not do well without impractical user manipulation in the rare instances where it could possibly handle them. The information calculated in Excel is then put back into Project in an automated manner (e.g., the two sets of files, one in Excel and one in Project, are "synchronized") to enable use of both tools' filtering capabilities. Project cannot do much of the calculating, but it can provide special-purpose reporting and can allow extraction of spreadsheets containing only special subsets of information. Such project management software can also provide Summary information, showing what higher-level categories a task with special characteristic falls into—something which Excel's filters cannot do. This is another unique aspect of the process—Project has much more flexible filtering and reporting capabilities than Excel, even though it cannot perform the required underlying calculations. However, Project cannot exclude tasks which are scheduled after Implementation (a.k.a. after the "Go-Live" implementation date). It is highly useful to be able to identify and track those activities which must be completed in order for Implementation to occur, even though there may still be post-Implementation activities which should be recorded and tracked in a task schedule. This ability is highly useful in enabling management in the organization to put a laser-like focus on only what must be done for Implementation; the urgency of post-Implementation tasks is almost always lower than for Implementation activities. In summary, the combination of the spreadsheet software's filtering and reporting capability and the project management tool's filtering capability provides a mechanism to perform more highly sophisticated filtering and reporting than either tool operating on its own, and in a more-efficient manner than either tool provides on its own.

Returning again to FIG. 2, at a step 240 in a project management process in accordance with the disclosed principles, the updated information for a given update cycle is reported. For example, Table 2 below sets forth a number of exemplary reports that may be provided regarding the current status of the overall project.

TABLE 2

| | |
|---|---|
| Elapsed Time Categories | Elapsed Time and Percent of Project Time as of {this cycle} (e.g. 73 Percent) |
| | Elapsed Time Difference as of {this cycle} |
| Percent Complete Categories | Percent Complete Actual as of {this week} |
| | Actual Percent Comp vs. Elapsed Time |
| | Percent Complete Objective as of {this cycle} |
| | Live Date Actual Percent Complete vs. Live Date Objective as of {this week} (−1 Percent Diff) |
| | Live Date Percent Complete Actual as of {this cycle} |
| | Live Date Percent Comp Objective as of {this cycle} |
| | All Tasks Percent Complete Actual as of {this cycle} (0 Percent) |
| | All Tasks Percent Complete Objective as of {this cycle} (93 Percent) |
| | Live Date Percent Complete Change as of {3 cycles ago} (+1 Percent) |
| | Live Date Percent Complete Change as of {2 cycles ago} (+5 Percent) |

TABLE 2-continued

| | |
|---|---|
| | Live Date Percent Complete Change as of {this cycle} (0 Percent) |
| | Live Date Difference from Objective as of {3 cycles ago} |
| | Live Date Difference from Objective as of {2 cycles ago} |
| | Live Date Difference from Objective as of {this cycle} |
| Task Counts | Average Tasks per Team |
| | Number of Tasks - Net Change from Previous Cycle |
| | Percent Change from Previous Cycle |
| | Average Completed Tasks per Team |
| | Completed Tasks Net Change from Previous Cycle |
| | Completed Tasks - Percent Change from Previous Cycle |
| | Slipping Task History (As of {this cycle} Slipping Task Count = 82) |
| | Slipping Tasks as a Percent of Uncompleted Tasks |
| | Average Slipping Tasks per Team w/ Slipping Tasks |
| | Slipping Tasks - Net Change from Previous |
| | Slipping Tasks - Percent Change from Previous |
| | Coming Due (Potentially Slipping) History as of {this cycle} |
| | Average Potentially Slipping Tasks per Team w/ Slipping Tasks |
| | Potential Slipping Tasks - Net Change from Previous |
| | Potential Slipping Tasks - Percent Change from Previous |
| | Total Past Due (Slipping) Tasks |
| | Total Tasks Coming Due |
| | Total Tasks On Track |
| | Total Tasks Completed |
| | Number of Tasks as of {this cycle} (5,782 total) |
| | Change in Number of Tasks as of {this cycle} (8 total) |
| | Percent of Total Tasks By Team as of {this cycle} (5,782 Tasks in Total) |
| | Number Completed Through {this cycle} (5,375 total) |
| | Task Completion Analysis as of {this cycle} (248 Just Completed) |
| | Remaining (Uncompleted) Tasks as of {this cycle} (407 total) |
| | Slipping Tasks by Team (82 total) |
| | Slipping Tasks as a Percent of Remaining Tasks (ST = 20 Percent of All Remaining Tasks) |
| | Percent of Total Slipping Tasks as of {this cycle} |
| | Coming Due (Potentially Slipping) Tasks as of {this cycle} (169 total) |
| | Remaining (Uncompleted) Tasks as a Percent of Total Tasks as of {this cycle} (7 Percent) |
| | Task Count Percent Change from Previous |
| | Total Number of Remaining Tasks |
| | Task Count Net Change from Previous Week's Update |
| | As of {3 cycles ago}, 315 Tasks Were Slipping |
| | As of {2 cycles ago}, 104 Tasks Were Slipping |
| | As of {this cycle}, 82 Tasks Were Slipping |
| | Slipping Tasks as a Percent of Total Tasks as of {3 cycles ago} |
| | Slipping Tasks as a Percent of Total Tasks as of {2 cycles ago} |
| | Slipping Tasks as a Percent of Total Tasks as of {this cycle} |
| | As of {3 cycles ago}, Total Tasks Changed By +41 |
| | As of {2 cycles ago}, Total Tasks Changed By +19 |
| | As of {this cycle}, Total Tasks Changed By +8 |
| Task Durations (Task Length in Days) Analysis of Remaining (Uncompleted) Tasks | Overall Average Remaining Duration |
| | Management's Target for Overall Average Remaining Duration |
| | Project Remaining Time ({Implementation Date} Conversion) |
| | Remaining Duration Days (Only Tasks Due Before Conversion) |
| | Total Tasks Due By Conversion |
| | Percent of Total Remaining Tasks as of {this cycle} |
| | Unfinished Tasks Due by Live Date @ {4 cycles ago}(843 total) |
| | Unfinished Tasks Due by Live Date @ {3 cycles ago} (688 total) |
| | Unfinished Tasks Due by Live Date @ {2 cycles ago} (343 total) |
| | Unfinished Tasks Due by Live Date @ {this cycle} (123 total) |
| | 5 Workdays Remaining @ {this cycle} |
| | Unfinished Tasks Due by Live Date as a Percent of Total Tasks Due by Live Date @ {this cycle} |
| | Unfinished Tasks Due By Live Date Remaining Duration Days @ {3 cycles ago} |
| | Unfinished Tasks Due By Live Date Rem Duration Days @ {2 cycles ago} |
| | Unfinished Tasks Due By Live Date Rem Duration Days @ {this cycle} |
| | Tasks Due by Live Date as of {this cycle} (5,431 total) |
| | Total Tasks Due as of {this cycle} (5,782 total) |
| | Tasks Scheduled to Finish After Live Date as of {this cycle} (351 total) |

Using MS Project, reports that can be provided include a Gantt chart showing actual progress vs. expected progress (all teams), as well as a Gantt chart showing actual progress vs. expected progress for individual teams as needed. Of course, other charts may also be provided using the project management software. Then, in an exemplary embodiment, using a blend of Excel and Project other reports may be provided to illustrate exemplary items set forth in Table 3.

TABLE 3

Figure 6:
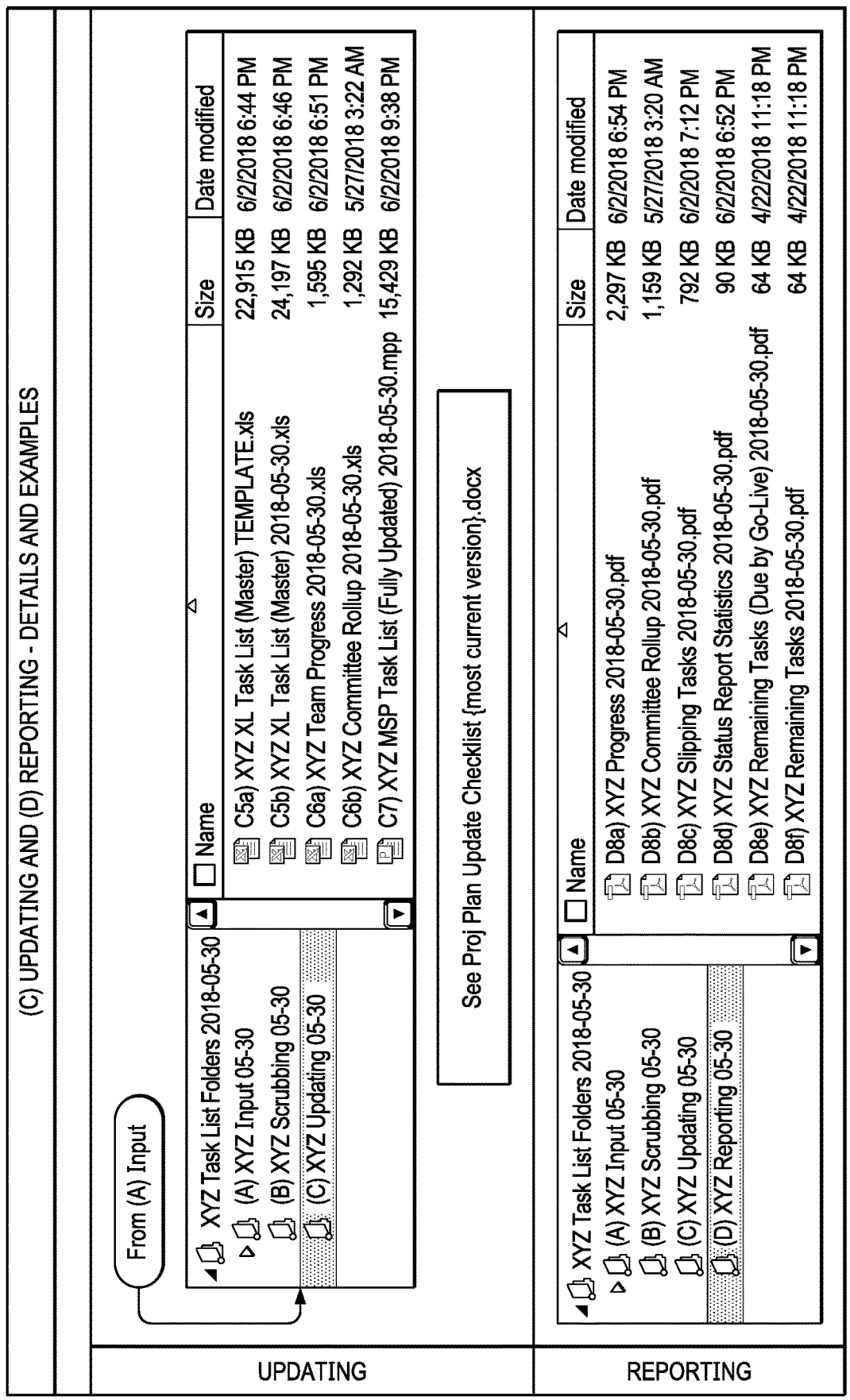
FIG. 6 illustrates more detailed exemplary sub-process flows for both the updating step and reporting step introduced in the process of FIG. 2 and set forth in further detail in FIGS. 3A-3C.

All Teams Slipping Only as of {Cycle Date}
{Vendor Name} Dependencies {Cycle Date}
All Teams Dependencies {Cycle Date}
All Teams Dependencies Not at 200 Percent {Cycle Date}
Critical Date or Info {Cycle Date}
Long Remaining Duration {Cycle Date}
Task Date Changes {Cycle Date}
Task Date Changes - 3 or More {Cycle Date}
Percent Complete Changes {Cycle Date Turning back again briefly to FIG. 2, step 240 in the illustrated process overview of an exemplary project management process as disclosed herein is such a Reporting step and can again include using both MS Excel and MS Project, as discussed above. For reporting using Excel, the updated information is reported automatically (i.e., after only one step manually identifying file name(s) from which to extract the calculated information for this update), and historical progress tracking of a number of data elements over the life of the project is provided. For reporting using Project, the information calculated in Excel is synchronized with Project to enable using Project's "filter" capabilities to extract specific high-value information. For example, such a process can result in reporting changes to Start Dates, Finish Dates, and Percent Completes at the task level, tasks which are Slipping (e.g., Past Due now, or will be Past Due soon), tasks with inordinately long durations, and any other tasks with changes which are considered suspect and should be acknowledged for review. By conducting the reporting step 240 in FIG. 2, this enables tight management control of team leaders, task completions, and task team performance. Only by providing a process in accordance with the disclosed principles using a combination of project management software and spreadsheet software can the project leader(s) produce the varied and rich information needed to completely manage large and complex projects. Also, looking at FIG. 6, illustrated are more detailed exemplary sub-process flows for both the updating step 230 and reporting step 240 introduced in FIG. 2 and set forth in further detail in FIGS. 3A-3C. As before, a file folder program may be employed for organizing scrubbed data, as well as receiving and organizing received updated input data.

Returning again to FIG. 2, prior to the reporting step 240 the disclosed exemplary project management process has the option of including an additional aligning step 235, illustrated in the flow diagram 200 of FIG. 2 in broken line. Such aligning may occur in the manner described with respect to the scrubbing step 220 in FIG. 2 or may follow a variation of the scrubbing process discussed above.

After the reporting step 240, whether including the optional additional aligning step 235 or not, the disclosed exemplary project management process moves to an Output Step 250. Specifically, information produced during each update cycle is output to appropriate teams. Additionally, information unchanged during any update cycle may also be re-output in order to output a comprehensive collection of information or data. Examples of information that may be output includes, but is not limited to, updated task schedules in either Excel or Project for use by the teams in updating their status and sending such statuses for analysis and reporting in the next update cycle's management reporting. Outputting of information may be done through either the project management or spreadsheet software product, or both. Typically, the output for each team or department of teams may be made using the same software product employed by those team(s) for inputting and/or updating information or data. As such, the appropriate software product provides the outputting, and does so automatically based on the updated information/data. In some embodiments, only minor manual intervention by a user is employed to subdivide the "master" plan containing all tasks for all teams into discrete team-level spreadsheets or Project files for outputting, if desired. Additionally, manual quality assurance review, and if needed, intervention, may also be employed in a project management process in accordance with the disclosed principles.

Figure 7:
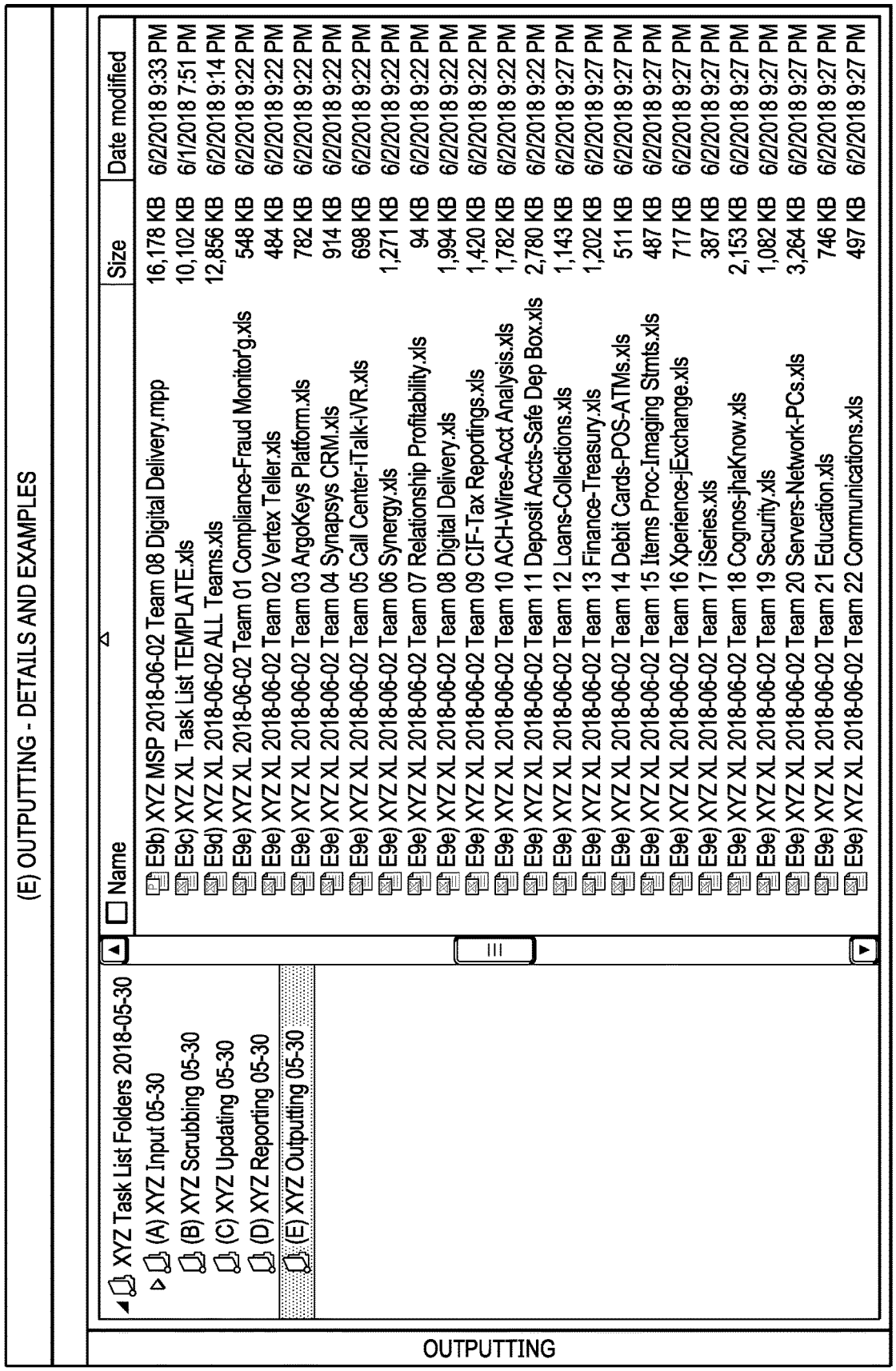
FIG. 7 illustrates a folder tree setting forth an exemplary set of output information/data to be output to various numbered teams conducting the overall project.

A primary purpose/goal of the outputting step 250 is to provide updated files (based on the updated step 230) back to the project's teams, which can then be updated with new information and submitted in the next update cycle for the overall project. Thus, where the reporting step may only be relegated to managers within the overall project, the outputting is done back to the team- and/or task-level. Of course, the reporting step may also be performed at the team- and/or task-level, along with the outputting step, or with slight variations from the targets of the outputting step. Turning back again briefly to FIG. 3C, the fifth step in the illustrated process overview of an exemplary project management process as disclosed herein is the Outputting step and can again include using both MS Excel and MS Project, as discussed above. And looking at FIG. 7, illustrated is a folder tree setting forth an exemplary set of output information/data to be output to various numbered teams conducting the overall project.

Next in the exemplary project management process shown in FIG. 2 is a decision step 260. At the decision step 260 it is determined if the overall project for which the disclosed project management process is conducted has been completed. If the overall project has been completed, then no further updating cycles are needed or reporting performed. As such, the process would move to an End Step. Optionally, final reporting and/or outputting steps may also be repeated based on the final results of the completed overall project. However, if the overall project is not yet completed, then the output of the exemplary disclosed process moves back to the scrubbing step 220 for re-entry into the next iteration of the exemplary disclosed project management process using the output of the current weekly or bi-weekly cycle as input. In doing so, scrubbing, updating, reporting, and outputting of information/data may then be performed efficiently as often as needed, and in the manner disclosed above, iteratively over a period of weeks, months or even years with the quality of the iteratively developed information produced by the unique unification of two disparate tools, uniquely combined, much higher than it was originally.

Figure 9:
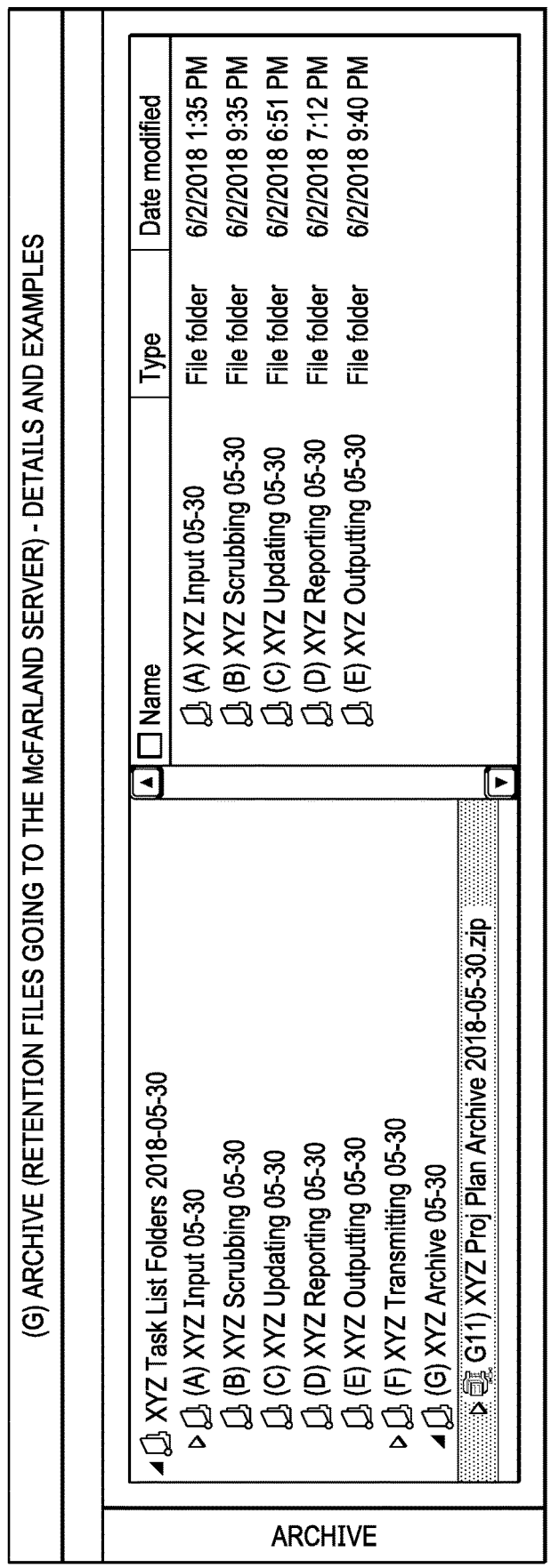
FIG. 9 illustrates a folder tree setting forth an exemplary archive for a specific iteration of an update cycle or at the conclusion of the project.

Looking now at FIG. 8, illustrated is a folder tree setting forth an exemplary set of updated information/data that is transmitted back to the organization for whom the overall project is being conducted. This transmitting is another step that may be included in the exemplary process set forth in FIG. 2 iteratively over time until the project has been completed. FIG. 9 illustrates a folder tree setting forth an exemplary set of transmitted information/data that maybe retained by the organization for whom the overall project is being conducted. This retention step is another optional step that may be included in the exemplary process set forth in FIG. 2.

Figure 10A:
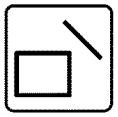

Looking finally at FIGS. 10A and 10B, collectively illustrated is an exemplary Status Report generated using the derived information from an iterative and interactive project management process according to the disclosed principles. Specifically, as shown in FIGS. 10A-10B, the iteratively derived information using the exemplary process discussed above has been used to produce key portions of a regular Status Report that may be delivered to, for example, the Board of Directors for the organization for which the overall project is performed.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary of the Invention" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A method for an iterative and interactive management process of a single project providing detailed status reporting critical for day-to-day management of the project, said project management process employed using both project management and spreadsheet software products, and comprising:
    (a) receiving input data for each of a plurality of project tasks assigned to a plurality of corresponding teams within said organization, said data manually input by one or more members of each of the plurality of teams using either said project management and spreadsheet software products or both products, and wherein said input data provides information regarding completing each task for the project;
    (b) scrubbing received manually-entered input data for accuracy, at predetermined intervals throughout the project, and adding new tasks discovered by said scrubbing to be necessary for the project as the project proceeds such that the data may be processed by the project management and spreadsheet software products, said scrubbing flagging detected errors in the input data for correction;
    (c) updating, at a predetermined interval throughout the project, the scrubbed input data at a task-level, said updating based on new or updated information received via manual input by one or more members of each of the plurality of teams using said project management or spreadsheet software products or both products corresponding to the received input data;
    (d) dynamically calculating a status of every task as of a reporting date, said dynamic calculating comprising comparing where each such status for each corresponding task is versus where each task should be with respect to a project deadline, said dynamic calculating using capabilities of both said project management and spreadsheet software products in combination;
    (e) reporting to management for the project on one or more said reporting dates, each reporting date being at a predetermined interval throughout the project, critical information regarding all of the tasks in the project, said critical information comprising variances at a task level based on said dynamic calculations comparing of where each status for each corresponding task is versus where each task should be with respect to the project deadline, so as to facilitate immediate corrective action to be taken to maintain said project deadline, said reporting further comprising reporting said variances to all teams on the project;
    (f) outputting and transmitting, at a predetermined interval throughout the project, the updated data and any unchanged input data to the plurality of teams regarding their corresponding tasks using the software product preferred by the corresponding team to input data, said output data prompting one or more members of the corresponding teams to manually input revised data regarding their corresponding project tasks, wherein if input revised data is received, returning to step (a) for processing the revised data as input data; and
    (g) determining if all project tasks mandatory to meet the project deadline have been completed, and if not, returning to step (a) for new or revised information or to step (b) for information unchanged from the previous iteration of the update cycle.

2. A method according to claim 1, wherein said input data provides information regarding one or more of:
    description or requirements of a task;
    adjusting the outline level of a task to make it a sub-task underneath an existing task;
    person or team accountable for a task;

percentage completed of a task;
start date, finish date and critical dates of a task;
user-defined information about a task or group of tasks;
adding new tasks or sub-tasks within an existing task;
when a task is dependent on another team, another individual or an external vendor;
when tasks are interdependent between two teams, what the status of those tasks are so that both teams are kept apprised of variances;
deleting tasks which are no longer needed;
user-provided notes regarding any task or its status;
project start date, project finish date and any critical project dates or project milestones; and
all tasks to be completed in order to complete the project.

3. A method according to claim 1, wherein said scrubbing further comprises ensuring each task has a valid start date, finish date, and percent complete information throughout the project.

4. A method according to claim 1, wherein said scrubbing is performed by one or more users not part of the team inputting the data.

5. A method according to claim 1, wherein said scrubbing is performed by first detecting errors in input data using the data entry software product capable of automatic correction and automatically correcting them with said software product, and then detecting errors in input data using the software product not capable of automatic correction and identifying said errors for manual correction by one or more members of a team inputting said data.

6. A method according to claim 1, wherein the new or updated information received via manual input by one or more members of each of the plurality of teams comprises one or more of:
start date of a task as of the previous update cycle;
a changed start date of a task from the previous update cycle;
number of times a start date of a task has been changed since the previous update cycle;
finish date of a task as of the previous update cycle;
a changed finish date of a task from a previous update cycle;
number of times a finish date of a task has been changed since the previous update cycle;
percentage complete required for a task for a given date;
a changed percentage complete of a task from the previous update cycle.

7. A method according to claim 1, wherein the critical information comprises one or more of:
tasks having changes to start dates;
tasks having changes to milestone dates;
tasks having changes to finish dates;
tasks having changes to percent complete;
tasks that are past due;
tasks that will be past due within a predetermined period;
tasks with inordinately long durations relative to other tasks;
tasks changed from one team to another.

8. A method according to claim 1, wherein the critical information comprises one or more reports generated with the spreadsheet software product, and comprising one or more of:
elapsed time for one or more tasks;
percentage complete for one or more tasks;
task counts;
duration of one or more tasks;
tasks interdependent on another team or person;
completed tasks; and
remaining uncompleted tasks.

9. A method according to claim 1, wherein the critical information comprises one or more reports generated with the project management software product, and comprising one or more of:
actual progress versus expected progress for individual tasks;
actual progress versus expected progress for all tasks;
revised task schedule(s);
actual progress versus expected progress for individual teams; and
actual progress versus expected progress for all teams.

10. A method according to claim 1, wherein the reporting critical information comprises providing a Work Breakdown Structure comprising a hierarchical breakdown of the project into tasks organized by the one or more teams, said Work Breakdown Structure including a percent complete for any tasks in the project.

11. A method according to claim 1, wherein the reporting critical information comprises providing a list of tasks requiring review by project management based on the updated input data.

12. A method according to claim 1, wherein the reporting critical information comprises providing a report comprising final results of all completed tasks.

13. A method according to claim 1, wherein the reporting critical information further comprises generating a report comprising actual percentage complete of all tasks versus planned percentage complete of said tasks at said reporting.

14. A method according to claim 1, wherein the reporting critical information further comprises generating a report comprising actual percentage complete of all tasks of a team versus planned percentage complete of said tasks of said team at said reporting.

15. A method according to claim 1, wherein one or more of the predetermined intervals is a daily or weekly interval.

16. A method according to claim 1, wherein the spreadsheet software product is Microsoft Excel and the project management software product is Microsoft Project.

17. A method according to claim 1, wherein receiving the input data for each of a plurality of project tasks comprises storing the input data for each task in a dedicated computer folder using a file explorer software product, wherein said computer folder does not comprise a database.

18. A method according to claim 1, wherein the reporting further comprises combining the updated data and unchanged input data from the corresponding project management and spreadsheet software products using a third software product.

19. A method according to claim 1, further comprising archiving each cycle of scrubbed input data and updated data to facilitate monitoring of task performance over predetermined periods.

20. A method according to claim 1, further comprising maintaining a history of task level performance indicators tracked over a predetermined period of time over said project.

* * * * *